United States Patent
Fu et al.

(10) Patent No.: US 7,957,104 B2
(45) Date of Patent: Jun. 7, 2011

(54) SUSPENSION WITH BI-LAYER FLEXURE BASE WHOSE LAYERS HAVE DIFFERENT COEFFICIENTS OF THERMAL EXPANSION TO ELIMINATE THERMALLY INDUCED FLYING HEIGHT VARIATIONS

(75) Inventors: Yen Fu, San Jose, CA (US); Ellis T. Cha, San Ramon, CA (US); Chao-Hui Yang, Milpitas, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 720 days.

(21) Appl. No.: 11/692,133

(22) Filed: Mar. 27, 2007

(65) Prior Publication Data

US 2008/0239572 A1 Oct. 2, 2008

(51) Int. Cl.
*G11B 5/56* (2006.01)

(52) U.S. Cl. .................................................... 360/294.7
(58) Field of Classification Search .................. 360/294.7
See application file for complete search history.

(56) References Cited

U.S. PATENT DOCUMENTS

| 5,754,355 | A | 5/1998 | Nakamura et al. | |
| 6,760,182 | B2* | 7/2004 | Bement et al. | 360/75 |
| 6,952,330 | B1* | 10/2005 | Riddering et al. | 360/294.7 |
| 7,436,631 | B1* | 10/2008 | Fanslau et al. | 360/294.7 |

* cited by examiner

*Primary Examiner* — A. J. Heinz
(74) *Attorney, Agent, or Firm* — Saile Ackerman LLC; Stephen B. Ackerman

(57) ABSTRACT

A flexure with improved temperature sensitivity is disclosed. An embodiment of the present invention includes a bi-layered flexure that raises or lowers a read/write element a distance that is approximately equal to the distance of protrusion and retraction at varying temperatures.

5 Claims, 7 Drawing Sheets

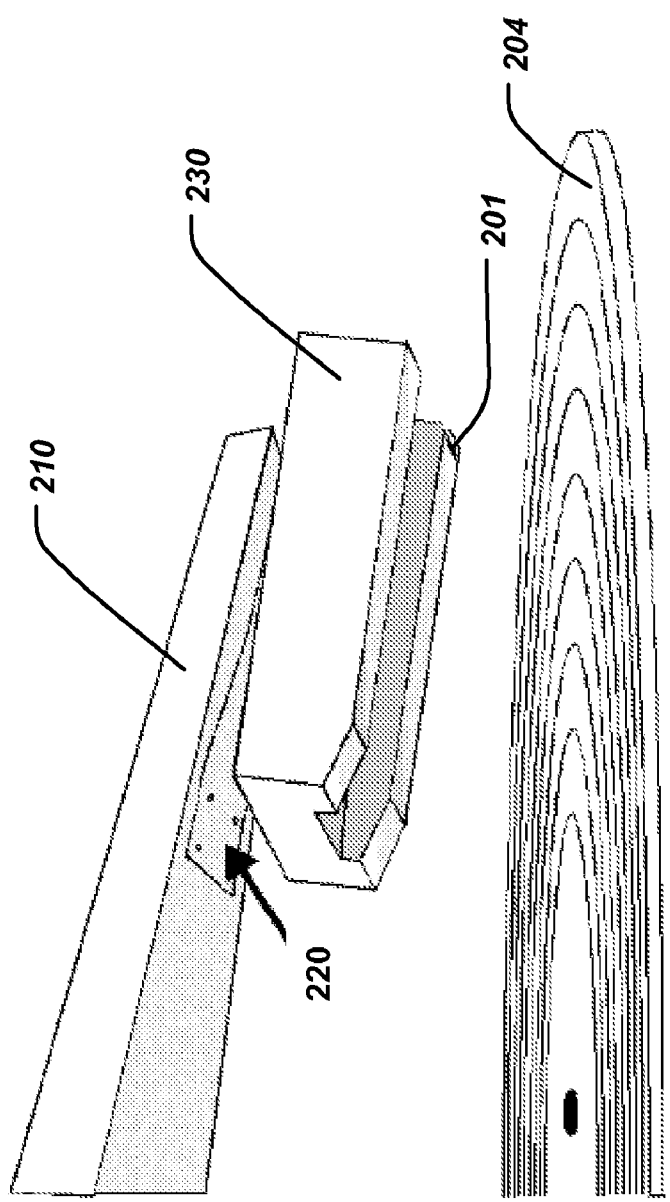

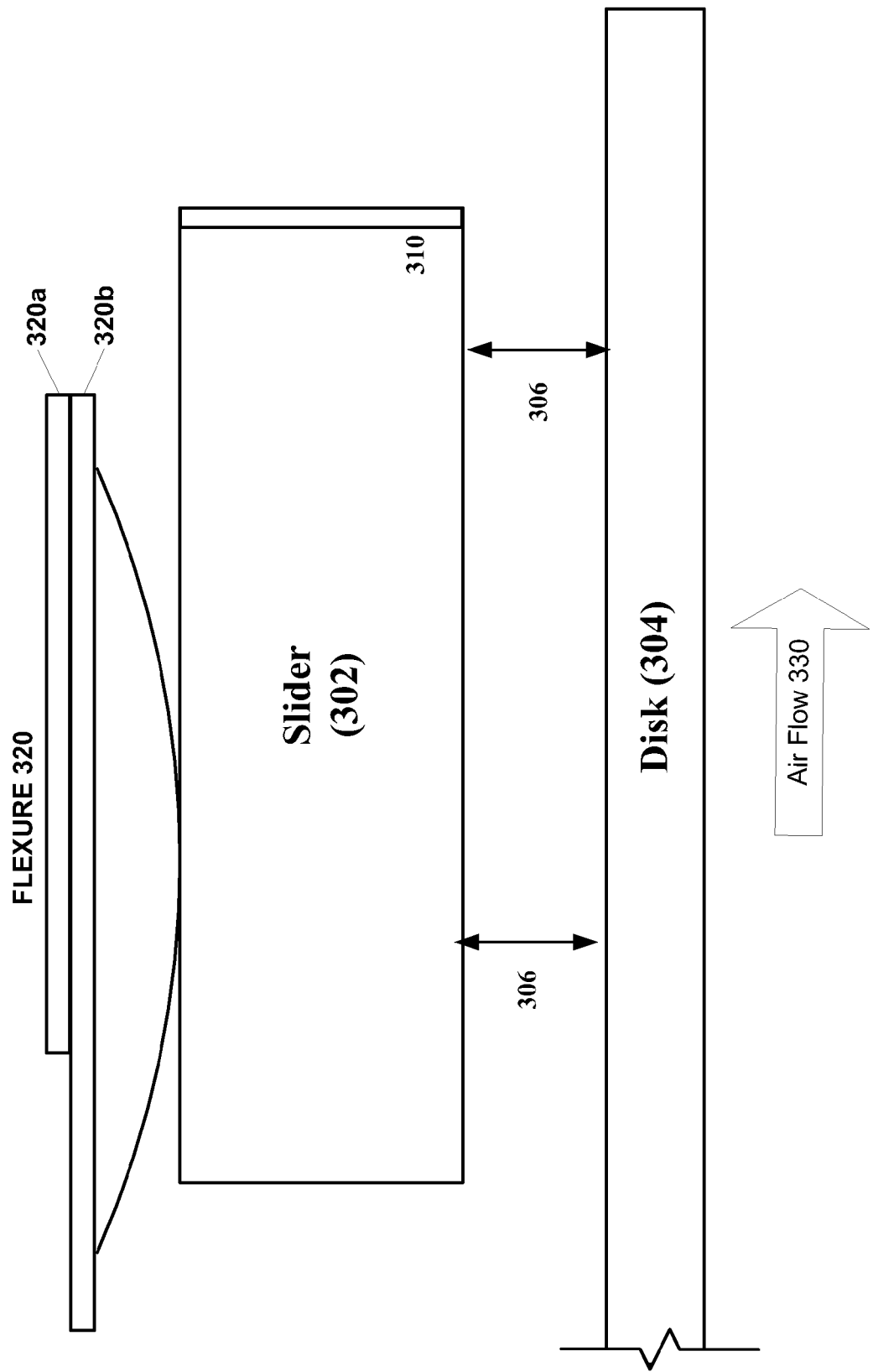

SUSPENSION WITH BI-LAYER FLEXURE BASE WHOSE LAYERS HAVE DIFFERENT COEFFICIENTS OF THERMAL EXPANSION TO ELIMINATE THERMALLY INDUCED FLYING HEIGHT VARIATIONS

FIELD OF THE INVENTION

This invention relates to hard disk drives. More particularly, it relates to suspension designs with a bi-layer flexure base.

BACKGROUND

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few nanometers above the surface of the rotating disk. The flying height of the slider is viewed as one of the most critical parameters affecting the reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desirable benefits which may be more readily achieved through particular ABS designs. Fluctuations in flying height are known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or living sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

In order to make the ABS fly stably and reliably under variable conditions, many parameters of the suspension supporting the ABS must be accounted for. For example, a suspension system will have a vertical stiffness (Kz), a gimbal pitch (Kp), a roll stiffness (Kr), and a gimbal static attitude (pitch/roll static attitude, PSA/RSA), all of which will affect the flying behavior of the ABS. Existing art for suspension designs focuses on minimizing the effects of environmental conditions such as temperature and humidity on these parameters. There is a need for an improved approach to achieving a stable flying height.

SUMMARY OF THE INVENTION

Rather than trying to minimize the effects of different environmental conditions, one embodiment of the present invention calls for designing a suspension system where the change experienced by one element of the suspension will counteract the changes experienced by a different element, thus resulting in no net change to the flying height.

Flexures as known in the art are made of a single materials typically stainless steel. In one embodiment of the present invention, a bi-layered flexure, made with two different materials, is used to improve a slider's flying height sensitivity to temperature. Pairing materials with mismatched coefficients of thermal expansion may cause the flexure to exert either an upward or downward force on the slider and read/write element as temperature changes. A suspension design may use this upward or downward force to counteract any protrusion or retraction of the read/write element that may result from varying temperatures, thus achieving a substantially constant flying height across a wide range of temperatures.

BRIEF DESCRIPTION OF THE DRAWINGS

FIG. 2 is a three-dimensional representation of a suspension design with a slider floating above a rotating disk.

FIGS. 3a-c are two-dimensional representations of a suspension design with a bi-layer flexure base.

DETAILED DESCRIPTION

Figure 1:
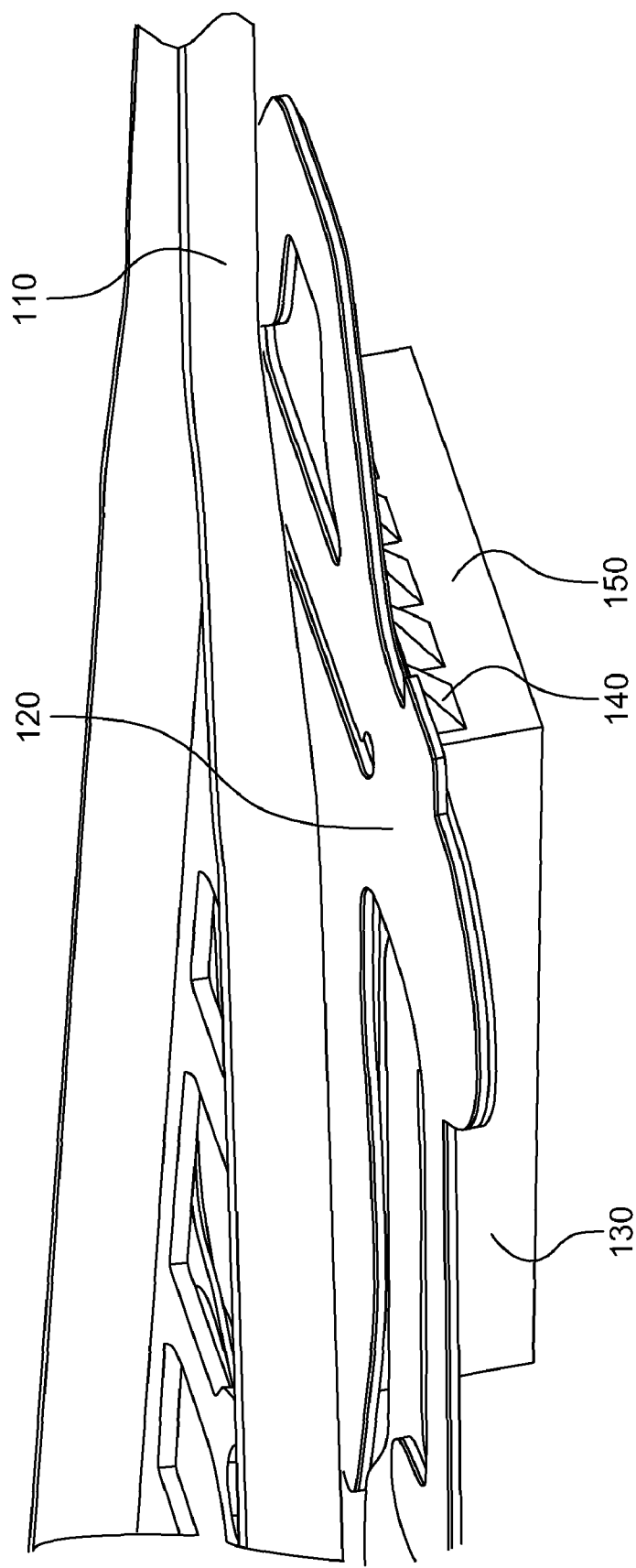
FIG. 1 is a three-dimensional representation of a suspension design with a bi-layer flexure base.

FIG. 1 is a three-dimensional illustration of a portion of a suspension with a loadbeam 110, a flexure 120 and a slider 130 with electrical terminations 140 to the flexure. The slider 130 has a read/write element embedded in its trailing edge 150. FIG. 2 shows an alternative view of a head slider 230 flying over the surface of a magnetic disk 204. The slider 230 is floating over the surface of the disk 204 on a cushion of air that is generated from the disk's 204 rotation. The slider 230 is connected to a load beam 210 via a flexure 220, and the slider contains a read/write element 201 at its trailing edge.

The slider body 230 may be made of a ceramic material wile the read/write element 201 will typically be made of a metallic material. Metallic materials typically have larger coefficients of thermal expansion compared to ceramic materials, meaning changes in temperature may cause the read/write element 201 to contract or protrude relative to the slider body 230. As illustrated by FIG. 2, the flexure 220 prevents the slider from being rigidly attached to the load beam 210. Flexures 220 are typically made of stainless steel, meaning they will also thermally expand or contract at changing temperatures. An embodiment of the present invention utilizes a flexure 220 that, when undergoing thermal expansion or contraction, will lower or elevate the slider body 230 by an amount that offsets the contraction or protrusion of the read/write element 201, therefore achieving a substantially constant flying height.

An embodiment of the present invention uses a bi-layer flexure base made with two different materials with different coefficients of thermal expansion (CTE). The table below gives a sample of some of the materials that can be used in layers of a flexure and their associated properties:

|  | SST | Au | Pt | Ti alloy | Invar | Al |
| --- | --- | --- | --- | --- | --- | --- |
| E (GPa) | 178.5 | 77.2 | 171 | 110 | 148 | 70 |
| ν | 0.32 | 0.42 | 0.39 | 0.33 | 0.23 | 0.33 |
| ρ (g/cc) | 8.072 | 19.32 | 21.45 | 4.7 | 8.05 | 2.7 |
| CTE (ppm/° C.) | 17.2 | 14.4 | 9.1 | 8.7 | 1.3 | 24 |
| PSA change (min/° C.) | −0.09 | −0.38 | −1.36 | −1.13 | −2.28 | 0.58 |

When choosing materials for the layers of the flexure base, factors such as a material's Young's Modulus (E), Poissson's ratio (ν), density (ρ), and pitch static attitude (PSA) must all be considered in addition to the materials' CTE. For example, when choosing materials, it is common to choose polymers that are non-absorbent and will, therefore, not expand with increased humidity.

Figure 3B:
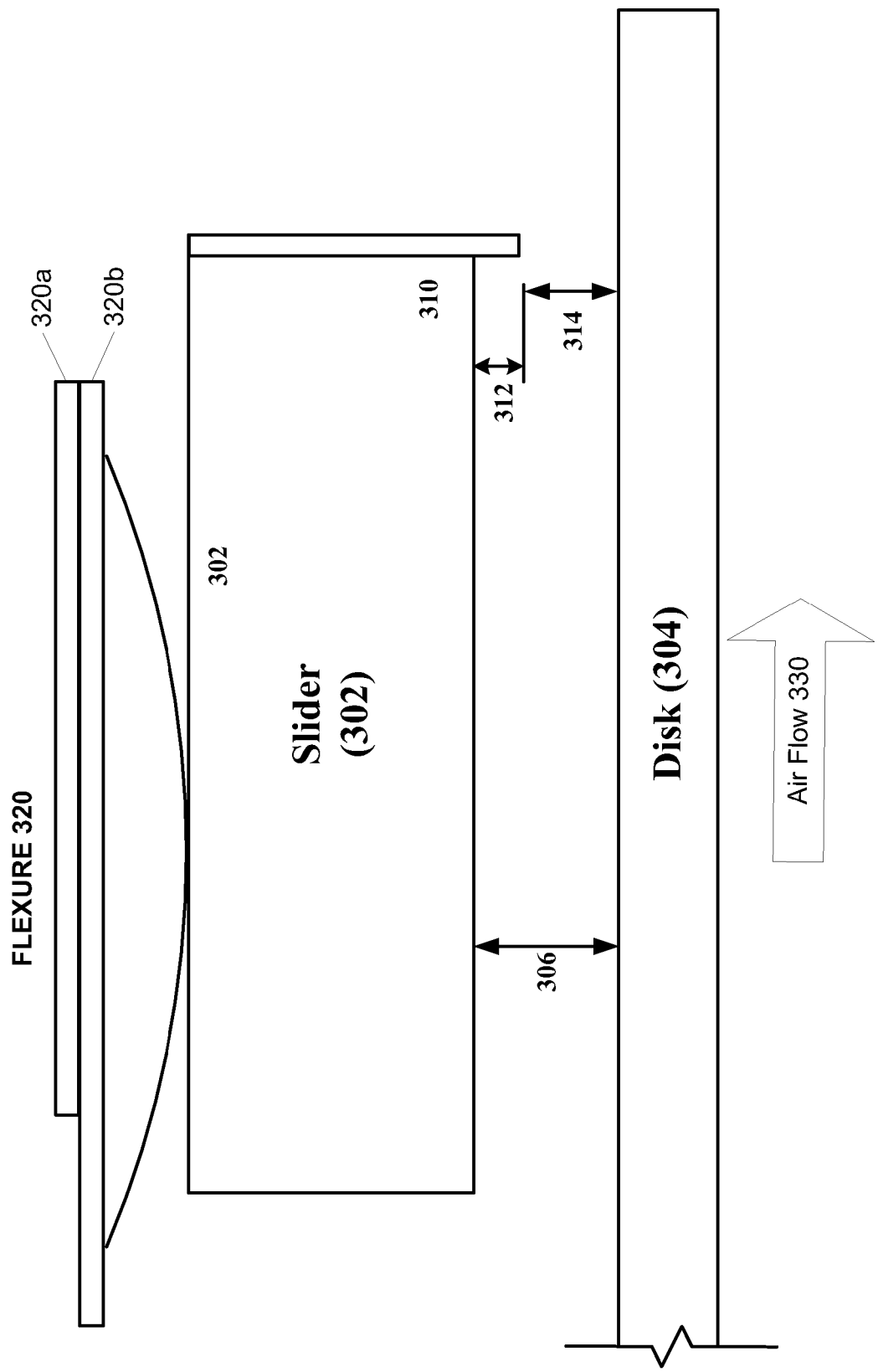
Figure 3C:
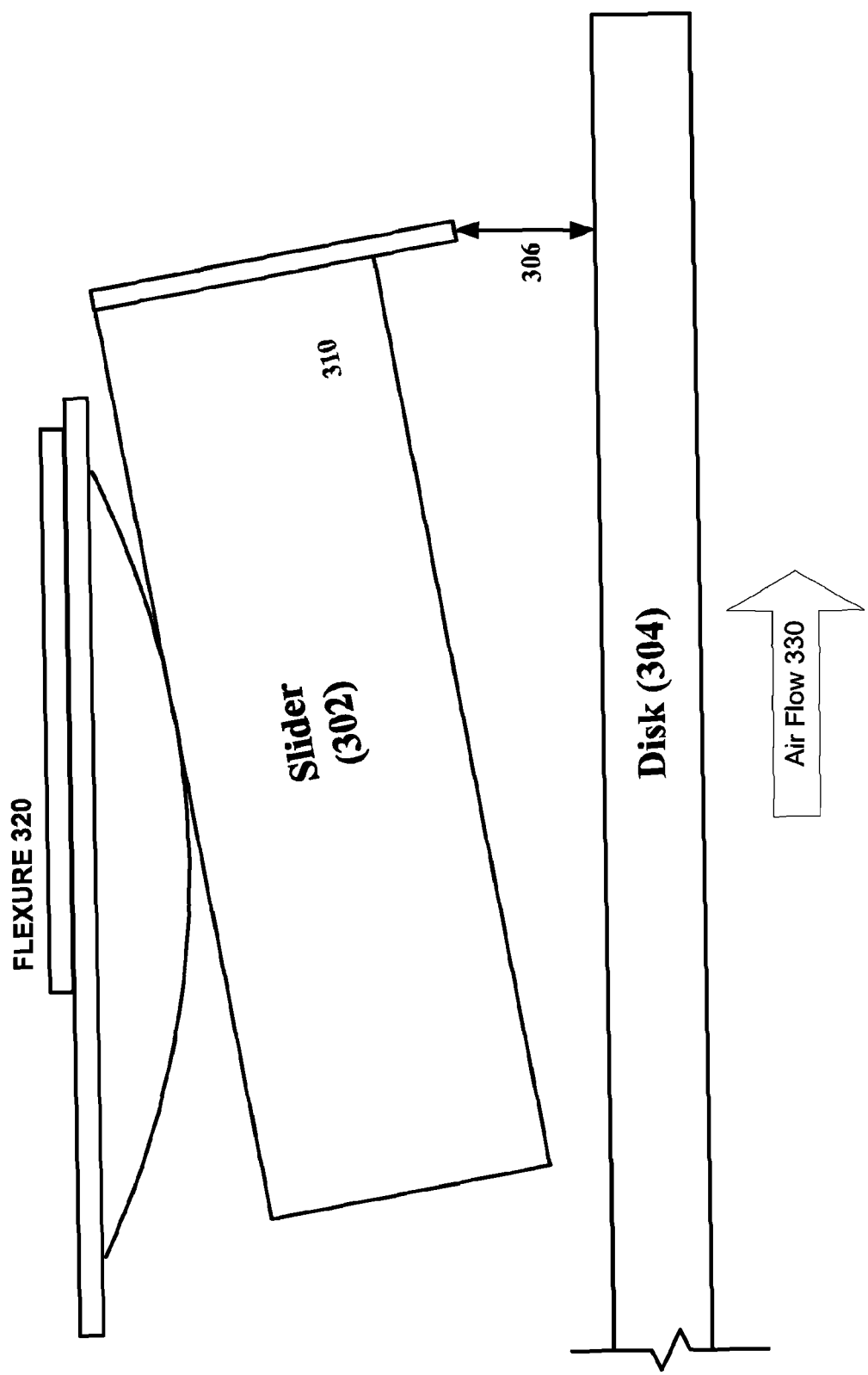

FIGS. 3a-c are two-dimensional illustrations of a suspension design with a bi-layer flexure. The drawings are not to scale, and changes in the relative positions of elements are exaggerated to more clearly show aspects of the present invention. A flexure 320 made of two different materials 320a and 320b supports a slider 302 with a read/write element 310 at the trailing edge. The airflow 330 created from the spinning disk 304 lifts the slider 302 above the disk 304 to a nominal flying height 306.

FIG. 3b shows the change the read/write element 310 might experience at a higher temperature as the result of the thermal expansion effect. The increase in temperature causes the pole tip of the read/write element 310 to protrude toward the disk by an additional amount 312. The net spacing 314 between the pole tip and the disk is then equal to the nominal flying height 306 less the additional amount 312.

FIG. 3c shows an implementation of the present invention. By using a bi-layered flexure with two different materials with different CTEs, the protrusion of the pole tip can be offset by a lilting force created by the bi-layered flexure 320.

Figure 4A:
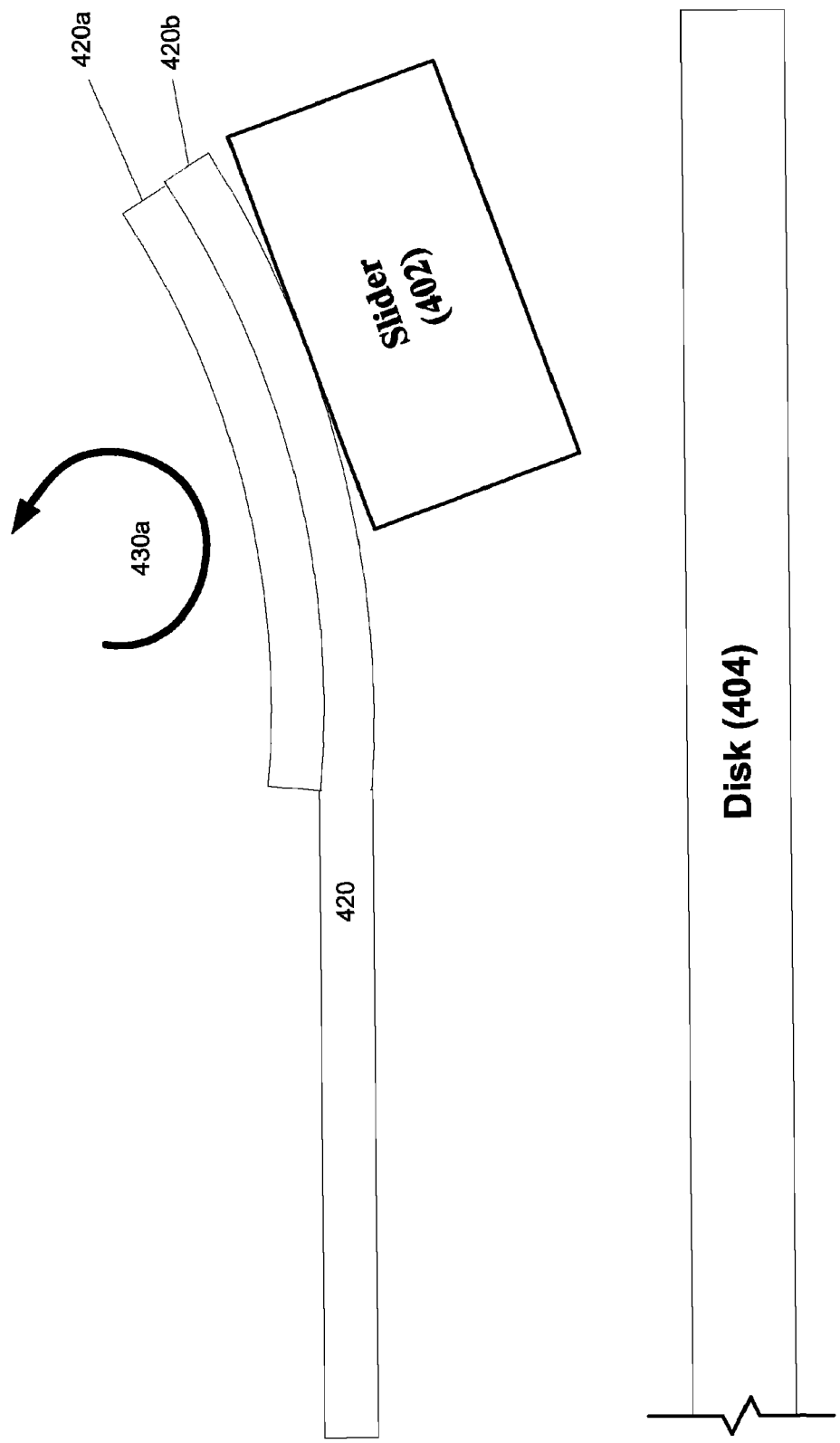
FIGS. 4a-b are alternative two-dimensional representations of a suspension design with a bi-layer flexure base.
Figure 4B:
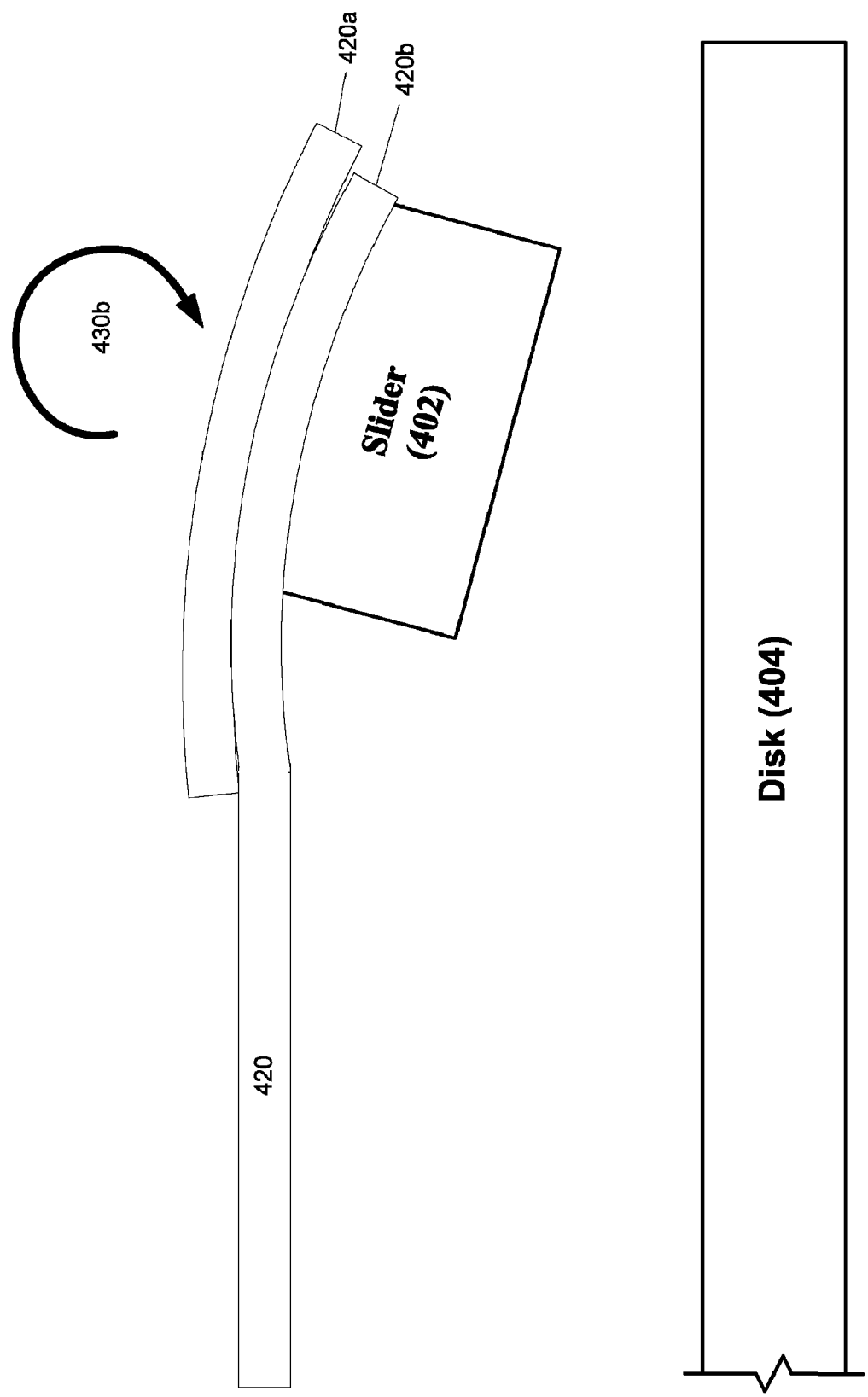

FIGS. 4a-b show alternate, two-dimensional views of a slider 402 connected to a flexure 420. As with FIGS. 3a-c, the drawings are not to scale, and changes in the relative positions of elements are exaggerated to more clearly show aspects of the present invention. The flexure is bi-layer, with a first layer 420b made of one material and a second layer 420a made of a different material. The first layer 420b is the side adjacent to the slider 402. The second layer 420a has a smaller CTE than the first layer 420b. FIG. 4a shows the flexure and slider at a high temperature. At increasing temperatures, the first layer 420b will expand more than the second layer 420a, creating a torque in the direction shown at arrow 430a. The torque will result in a lifting force elevating the slider body 402 relative to the disk 404

FIG. 4b, shows the flexure 420 and slider 402 at a low temperature. At decreasing temperatures, the first layer 420b will contract more than the second layer 420a, creating a torque in the direction shown at arrow 430b. The torque will result in the slider 402 being lowered relative to the disk 404.

Based on the type and pattern of the second material 420a, a flexure may be designed where the torque will elevate the slider 402 in an amount approximately equal to any protrusion caused by thermal expansion and lower the slider approximately equal to any retraction caused by thermal contraction, thus providing a virtually constant flying height at varying temperatures. Several variations in this general method are possible to achieve the desired thermal sensitivity of PSA, together with other parameters that need to be optimized.

In the simplest structure, the second layer can be made conformal to the first layer; i.e. one side of the flexure base is completely covered by and an identical second layer of uniform thickness. In a more complicated structure, the second layer can be made to cover selected areas on one side of the flexure base. A patterned design for the second layer provides an additional method to achieve the desired thermal sensitivity. Additionally, the thickness of the two layers may vary from one location to the next, adding another level of control to achieve the optimum thermal sensitivity, as well as other parameters.

As to how such a bi-layer based flexure can be produced, there are numerous available methods. One method is to use a bi-layer blank sheet to replace the single layered sheets currently used in the art. Another method is to deposit the second layer onto one side of a single layered sheet. Deposition of the second layer may be done by plating or various vacuum deposition methods. In either method, patterning of the second layer can be done by selective etching or deposition.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A disk drive comprising:
  a disk adapted to be rotated; and
  a flexure including
    a flexure body comprised of a first material layer with a first coefficient of thermal expansion and a second material layer with a second coefficient of thermal expansion that is less than said first coefficient of expansion, wherein said second material layer is affixed to said first material layer either conformally or in a patterned form or in a form having a variable thickness; and wherein a slider having an air bearing surface and including a reading and writing element is coupled adjacent to the first material layer of the flexure and wherein an increase in an ambient temperature of said flexure is accompanied by a corresponding increasing temperature of said first material layer and said second material layer and wherein a decrease in an ambient temperature of said flexure is accompanied by a corresponding decreasing temperature of said first material layer and said second material layer, whereby, as a result of differential thermal expansions of said first material layer and said second material layer said slider is elevated with increasing temperature and lowered with decreasing temperature of said first and second material layers to achieve a constant flying height.

2. The disk drive of claim 1, wherein the flexure is configured, by conformally affixing said second layer to said first layer or by patterning said second layer or by creating thickness variations in said first or second layers, to lift the reading and writing element a distance that is approximately equal to a protrusion of the reading and writing element relative to said air bearing surface caused by increased ambient temperature.

3. The disk drive of claim 1, wherein the flexure is configured, by conformally affixing said second layer to said first layer or by patterning said second layer or by creating thickness variations in said layers, to lower the reading and writing element a distance that is approximately equal to the retraction of the reading and writing element relative to said air bearing surface caused by decreased ambient temperature.

4. A flexure comprising:
a flexure body comprised of a first and second material layer, wherein a slider is coupled adjacent to the first material layer and wherein the first material layer has a greater coefficient of thermal expansion than the second material layer and wherein the second material layer is affixed to the first material layer either conformally or in a patterned form or in a form having a variable thickness and wherein said material layers are configured to respond to increases and decreases in ambient temperature by flexing in a manner that maintains a uniform flying height of a coupled slider.

5. The flexure of claim 4, wherein the material forming the first or second material layer is selected from the group consisting of SST, Au, Pt, Ti alloy, Invar, and Al.

\* \* \* \* \*